United States Patent
Mestha et al.

(10) Patent No.: US 10,826,922 B2
(45) Date of Patent: Nov. 3, 2020

(54) USING VIRTUAL SENSORS TO ACCOMMODATE INDUSTRIAL ASSET CONTROL SYSTEMS DURING CYBER ATTACKS

(71) Applicant: General Electric Company, Schenectady, NY (US)

(72) Inventors: Lalit Keshav Mestha, North Colonie, NY (US); Hema Kumari Achanta, Schenectady, NY (US); Justin Varkey John, Niskayuna, NY (US); Cody Joe Bushey, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/679,749

(22) Filed: Nov. 11, 2019

(65) Prior Publication Data
US 2020/0076838 A1    Mar. 5, 2020

Related U.S. Application Data

(63) Continuation of application No. 15/683,250, filed on Aug. 22, 2017, now Pat. No. 10,505,955.

(51) Int. Cl.
*H04L 29/06* (2006.01)
*G06K 9/62* (2006.01)
(Continued)

(52) U.S. Cl.
CPC .......... *H04L 63/1416* (2013.01); *G06F 21/50* (2013.01); *G06F 21/554* (2013.01);
(Continued)

(58) Field of Classification Search
CPC ............. H04L 63/1416; H04L 63/1441; H04L 63/145; H04L 63/1466; G06F 21/50; G06F 21/56–568
See application file for complete search history.

(56) References Cited

U.S. PATENT DOCUMENTS

2006/0018466 A1* 1/2006 Adelstein ............ H04L 63/1491
380/46
2010/0141423 A1* 6/2010 Lin ........................ G08B 25/10
340/539.1

(Continued)

OTHER PUBLICATIONS

Kartik et al., "A theoretically rigorous approach to soft sensor development using Principal Component Analysis", pp. 793-797 (Year: 2011).*

(Continued)

*Primary Examiner* — Thaddeus J Plecha
(74) *Attorney, Agent, or Firm* — Buckley, Maschoff & Talwalkar LLC

(57) ABSTRACT

In some embodiments, an industrial asset may be associated with a plurality of monitoring nodes, each monitoring node generating a series of monitoring node values over time that represent operation of the industrial asset. A threat detection computer may determine that an attacked monitoring node is currently being attacked. Responsive to this determination, a virtual sensor coupled to the plurality of monitoring nodes may estimate a series of virtual node values for the attacked monitoring node(s) based on information received from monitoring nodes that are not currently being attacked. The virtual sensor may then replace the series of monitoring node values from the attacked monitoring node(s) with the virtual node values. Note that in some embodiments, virtual node values may be estimated for a particular node even before it is determined that the node is currently being attacked.

17 Claims, 23 Drawing Sheets

(51) Int. Cl.
*G06F 21/56* (2013.01)
*G06F 21/50* (2013.01)
*G06F 21/55* (2013.01)
*G06F 21/57* (2013.01)

(52) U.S. Cl.
CPC .......... *G06F 21/566* (2013.01); *G06F 21/577* (2013.01); *G06K 9/62* (2013.01); *H04L 63/145* (2013.01); *H04L 63/1425* (2013.01); *H04L 63/1441* (2013.01); *H04L 63/1466* (2013.01); *H04L 63/1491* (2013.01); *G06F 2221/2101* (2013.01)

(56) References Cited

U.S. PATENT DOCUMENTS

| | | | | |
|---|---|---|---|---|
| 2012/0166878 | A1* | 6/2012 | Sinha | H04L 41/064 714/37 |
| 2014/0283047 | A1 | 9/2014 | Dixit et al. | |
| 2015/0369640 | A1* | 12/2015 | Schulze | H01L 21/67253 702/183 |
| 2017/0163734 | A1* | 6/2017 | Basu | H04L 67/12 |
| 2017/0214745 | A1* | 7/2017 | Shin | H04L 67/125 |
| 2017/0264629 | A1 | 9/2017 | Wei et al. | |
| 2017/0371311 | A1* | 12/2017 | Aparicio Ojea | G05B 19/0423 |
| 2018/0181112 | A1* | 6/2018 | Wang | G05B 19/058 |
| 2018/0203949 | A1* | 7/2018 | Hagen | G01M 5/0041 |
| 2018/0213348 | A1* | 7/2018 | Natarajan | H04W 52/0203 |

OTHER PUBLICATIONS

Facco et al., "Moving average PLS soft sensor for online product quality estimation in an industrial batch polymerization process", pp. 520-529 (Year: 2008).*

Agrawal et al., "Poster: Physics-Based Attack Detection for an Insider Threat Model in a Cyber-Physical System", pp. 821-823 (Year: 2018).*

Saad et al., "On the Implementation of IoT-Based Digital Twin for Networked Microgrids Resiliency Against Cyber Attacks", pp. 1-13 (Year: 2020).*

Paridari et al.: "Cyber-Physical-Security Framework for Building Energy management Systems", 9 pages (Year: 2016).

Ahmed et. al.: "Limitations of State Estimation Based Cyber Attack Detection Schemes in Industrial Control Systems", 5 pages (Year: 2016).

Paridari et. al: "A Framework for Attack-Resilient Industrial Control Systems: Attack Detection and Controller Reconfiguration", pp. 113-128 (Year: 2017).

Fawzi et. al.: "Secure Estimation and Control for Cyber-Physical Systems Under Adversarial Attacks", pp. 1454-1467 (Year: 2014).

* cited by examiner

VIRTUAL SENSOR LOOKUP TABLE — 900

| VIRTUAL SENSOR MATRIX 910 | SIGNAL BEING ESTIMATED 920 |
|---|---|
| $C_{1,1}$ | DWATT |
| $C_{2,1}$ | TTXM |
| $C_{3,1}$ | CTD |
| $C_{4,1}$ | FQG |
| $C_{5,1}$ | CPD |
| $C_{6,1}$ | CTIM |
| $C_{1,2}$ | DWATT, TTXM |
| .... | .... |
| $C_{15,2}$ | CPD, CTD |

FIG. 9

USING VIRTUAL SENSORS TO ACCOMMODATE INDUSTRIAL ASSET CONTROL SYSTEMS DURING CYBER ATTACKS

CROSS REFERENCE TO RELATED APPLICATIONS

This application is a continuation of U.S. patent application Ser. No. 15/683,250, filed Aug. 22, 2017, now U.S. Pat. No. 10,505,955, the entire content of which is incorporated herein by reference in its entirety.

This invention was made with Government support under contract number DEOE0000833 awarded by the Department of Energy. The Government has certain right in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system, such as failure and diagnostics technologies, may not adequately address these problems—especially when multiple, simultaneous attacks occur since such multiple faults/failure diagnostic technologies are not designed for detecting stealthy attacks in an automatic manner.

It may be important to maintain an industrial asset's functionality during an attack. For example, an operator may want a power generation plant to continue to provide electricity even when one or more sensors, actuators, etc. are the subject of a cyber-attack. Moreover, it may be advantageous to provide protection for an industrial asset without requiring redundant components (e.g., industrial control systems) and/or any major changes and/or re-design of controllers.

SUMMARY

According to some embodiments, an industrial asset may be associated with a plurality of monitoring nodes, each monitoring node generating a series of monitoring node values over time that represent operation of the industrial asset. A threat detection computer may determine that an attacked monitoring node is currently being attacked. Responsive to this determination, a virtual sensor coupled to the plurality of monitoring nodes may estimate a series of virtual node values for the attacked monitoring node based on information received from monitoring nodes that are not currently being attacked. The virtual sensor may then replace the series of monitoring node values from the attacked monitoring node with the virtual node values.

Some embodiments comprise: means for determining, by a threat detection computer, that an attacked monitoring node is currently being attacked; means for estimating, by a virtual sensor, a series of virtual node values for the attacked monitoring node based on information received from monitoring nodes that are not currently being attacked; and means for replacing the series of monitoring node values from the attacked monitoring node with the virtual node values.

Some embodiments comprise: means for executing, by a virtual sensor creation platform, a forward feature transform; means for creating a virtual sensor estimation lookup table for an attacked monitoring node from monitoring nodes that are not currently being attacked; and means for executing an inverse feature transform.

Some embodiments comprise: means for receiving, at an adaptive protection unit located between a communication port to receive data from an external source and an industrial control system controller, the monitoring node values in substantially real time; means for receiving an indication that an attacked monitoring node is currently being attacked; and means for automatically replacing the series of monitoring node values associated with the attacked monitoring node with virtual sensor data before transmission to the industrial control system controller.

Some technical advantages of some embodiments disclosed herein are improved systems and methods to protect an industrial asset from cyber-attacks in an automatic and accurate manner.

BRIEF DESCRIPTION OF THE DRAWINGS

FIG. 9 includes a portion of a virtual sensor lookup table according to some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
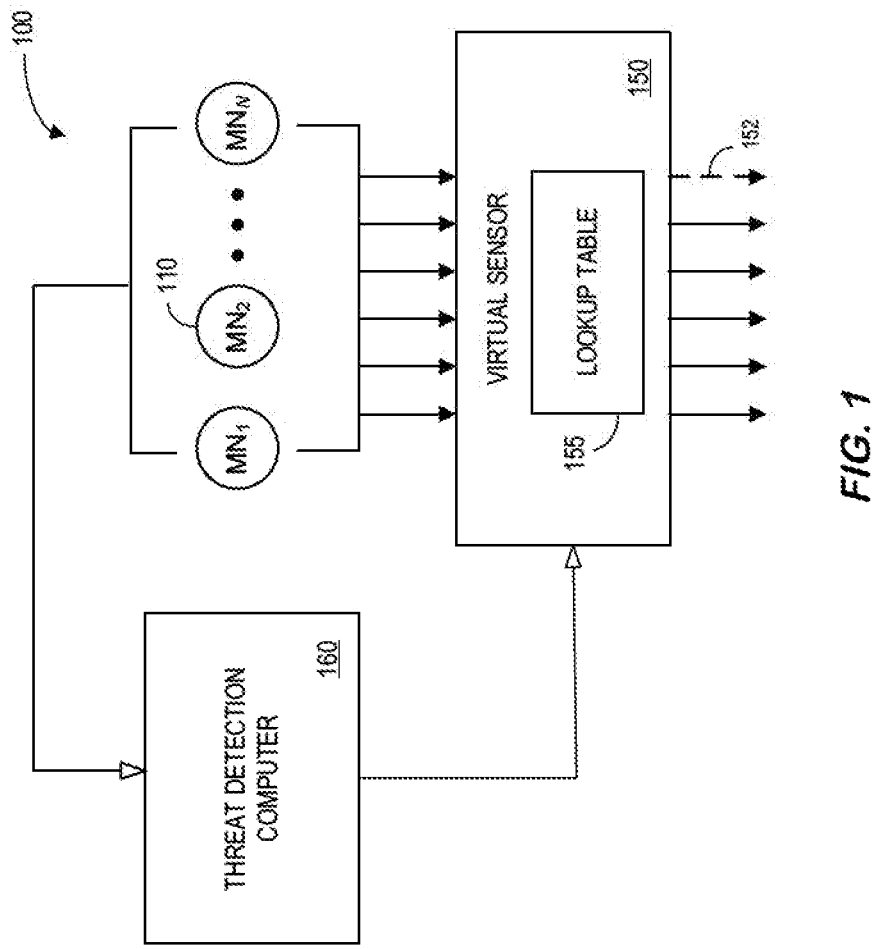
FIG. 1 is a high-level block diagram of a system to protect an industrial asset according to some embodiments.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. In particular, an operator of an industrial asset might want to implement "accommodation" procedures such that critical functions of the asset may automatically still function even in the event of one or more cyber-attacks (e.g., by replacing unhealthy sensor node data values with virtual sensor data values based on information obtained from other, healthy nodes). FIG. 1 is a high-level architecture of a system 100 that might be used to protect an asset. The system may include a plurality of monitoring nodes 110, each monitoring node generating a series of monitoring node values over time that represent operation of the industrial asset (e.g., a temperature, a speed, a voltage, etc.). A threat detection computer 160 coupled to the monitoring nodes 110 may be adapted to determine that a particular monitoring node is currently being attacked by a cyber-threat. A virtual sensor 150 may receive an indication of the attacked monitoring node and, as a result, estimate a series of virtual node values for the attacked monitoring node based on information received from monitoring nodes that not currently being attacked (e.g., using a lookup table 155). In some embodiments, preferably an estimation of series of virtual node values is happening in real-time during normal operation as opposed to estimating the virtual node values after the attack monitoring node information is received. Soon after the attacked monitoring node information is received, attacked monitoring nodes are replaced by the most current virtual node values. The virtual sensor may then replace the series of monitoring node values from the attacked monitoring node with the virtual node values (e.g., as illustrated by the dashed arrow output 152 in FIG. 1).

Figure 2:
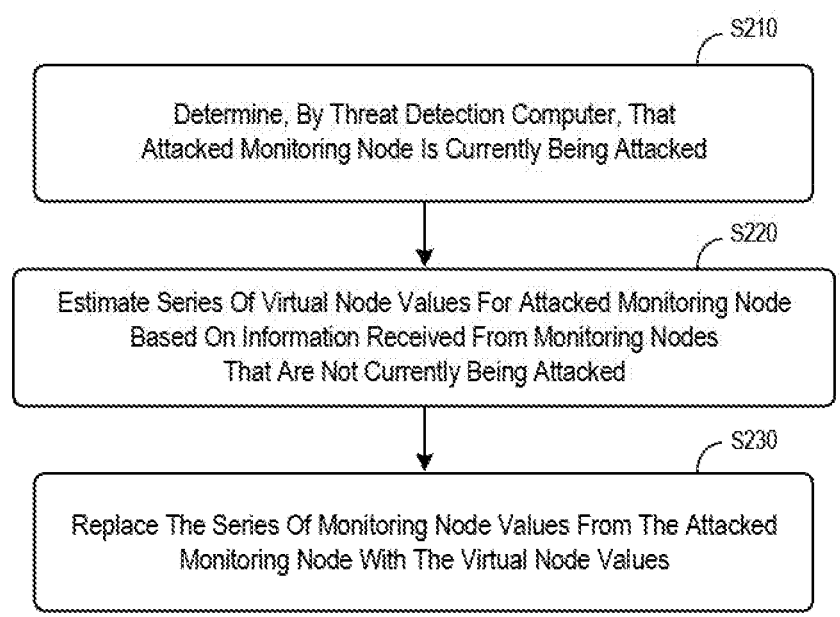
FIG. 2 is an industrial asset protection method in accordance with some embodiments.

FIG. 2 is an industrial asset protection method that might be associated with the elements of the system of FIG. 1. Note that the flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a threat detection computer might determine that an attacked monitoring node is currently being attacked. Examples of systems and processes that might be used to make such a determination are described, for example, with respect to FIGS. 2 through 4. At S220, a virtual sensor may estimate a series of virtual node values for the attacked monitoring node based on information received from monitoring nodes that are not currently being attacked. That is, information from "healthy" monitoring nodes may be used to estimate data from a monitoring node that is behaving abnormally. Note that the estimations associated with S220 might be performed even before a determination is made that a particular node is currently being attacked (e.g., S210). At S230, the series of monitoring node values from the attacked monitoring node may be replaced with the virtual node values. As a result, the industrial asset may continue to operate even when undergoing a cyber-attack.

Figure 3:
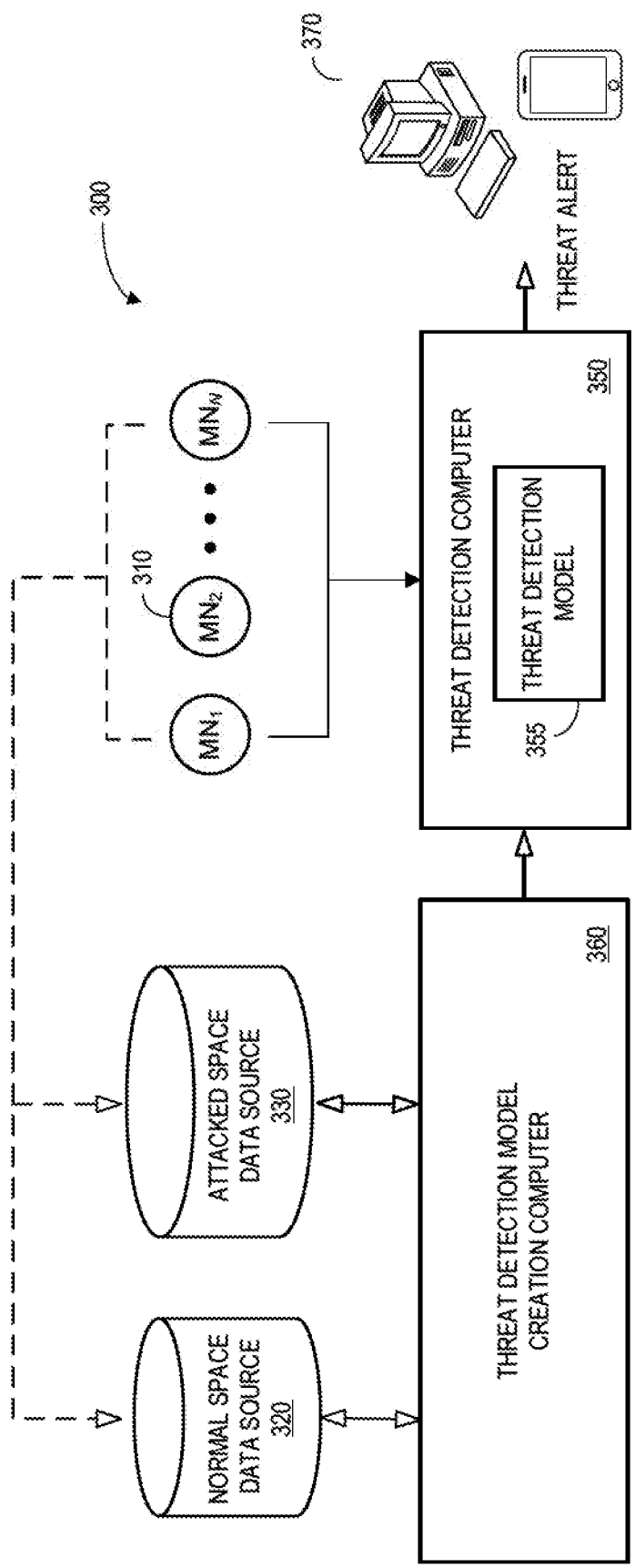
FIG. 3 is a block diagram of an industrial asset protection system according to some embodiment.

Note that a determination that a particular monitoring node is currently being attacked might be based on a threat detection model created for the industrial asset. For example, FIG. 3 is an example of an industrial asset protection system 300. The system 300 may include a "normal space" data source 320 storing, for each of a plurality of monitoring nodes 310, a series of normal values over time that represent normal operation of an industrial asset (e.g., collected from actual monitoring node 310 data as illustrated by the dashed line in FIG. 3). The system 300 may also include an "attacked space" data source 330 storing series of values over time associated with monitoring nodes undergoing a cyber-attack (e.g., as recorded during an actual attack or as predicted by a high-fidelity physics-based industrial asset model).

Information from the normal space data source 320 and the attacked space data source 330 may be provided to a threat detection model creation computer 360 that uses this data to create a decision boundary (that is, a boundary that separates normal behavior from abnormal or attacked behavior). The decision boundary may then be used by a threat detection computer 350 executing a threat detection model 355. The threat detection model 355 may, for example, monitor streams of data from the monitoring nodes 310 comprising data from sensor nodes, actuator nodes, and/or any other critical monitoring nodes (e.g., monitoring nodes $MN_1$ through $MN_N$) and automatically output a threat alert (e.g., indicating that various monitoring nodes of the industrial asset are normal or attacked) to one or more remote monitoring devices 370 when appropriate (e.g., for display to a user) and/or to a virtual sensor. As used herein, the term "automatically" may refer to, for example, actions that can be performed with little or no human intervention. According to some embodiments, information about a detected attack may be transmitted back to an industrial control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 360 may store information into and/or retrieve information from various data stores, such as the normal space data source 320 and the attacked space data source 330. The various data sources may be locally stored or reside remote from the threat detection model creation computer 360. Although a single threat detection model creation computer 360 is shown in FIG. 3, any number of such devices may be included. Moreover, various devices described herein might be combined according to embodiments of the present invention. For example, in some embodiments, the threat detection model creation computer 360, normal space data source 320, and attacked space data source 330 might comprise a single apparatus. The threat detection model creation computer 360 and/or threat detection computer 350 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage attack and system information in accordance with any of the embodiments described herein. In some cases, an interactive graphical display interface may let a user define and/or adjust certain parameters (e.g., attack detection trigger levels or model configurations) and/or provide or receive automatically generated recommendations or results from the threat detection model creation computer 360 and/or the threat detection computer 350.

Figure 4:
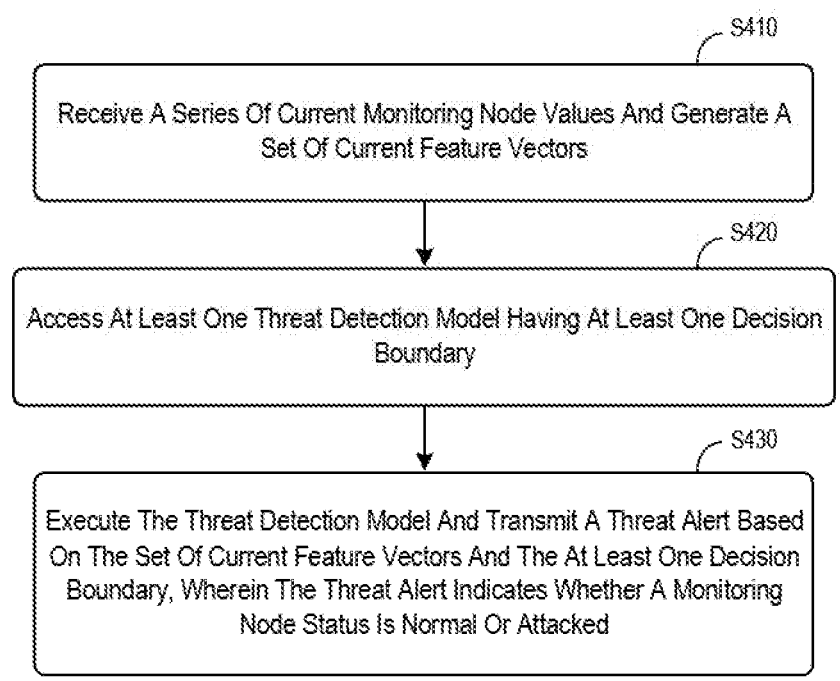
FIG. 4 illustrates a method of generating a threat alert in accordance with some embodiments.

The decision boundary associated with the threat detection model 355 can be used to detect cyber-attacks. For example, FIG. 4 is an industrial asset protection method that might be implemented according to some embodiments. At S410, the system may receive, from a plurality of monitoring nodes, a series of current values over time that represent a current operation of an industrial asset. The system may also generate, based on the received series of current values, a set of current feature vectors. At S420, a threat detection model may be accessed including at least one decision boundary. At S430, the model may be executed and a threat alert may be transmitted based on the set of current feature vectors and the decision boundary when appropriate (e.g., when a cyber-attack is detected). According to some embodiments, one or more response actions may be performed when a threat alert is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, a virtual sensor might be created or deployed, etc.

When available, a system may take advantage of the physics of an industrial asset by learning a priori from tuned high fidelity equipment models and/or actual "on the job" data to detect single or multiple simultaneous adversarial threats to the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked"). This decision boundary may be constructed in feature space using dynamic models and may help enable early detection of vulnerabilities (and potentially avert catastrophic failures) allowing an operator to restore the control system to normal operation in a timely fashion. Note, however, that in many cases a physics-based model of an industrial asset might not be readily available.

Figure 5:
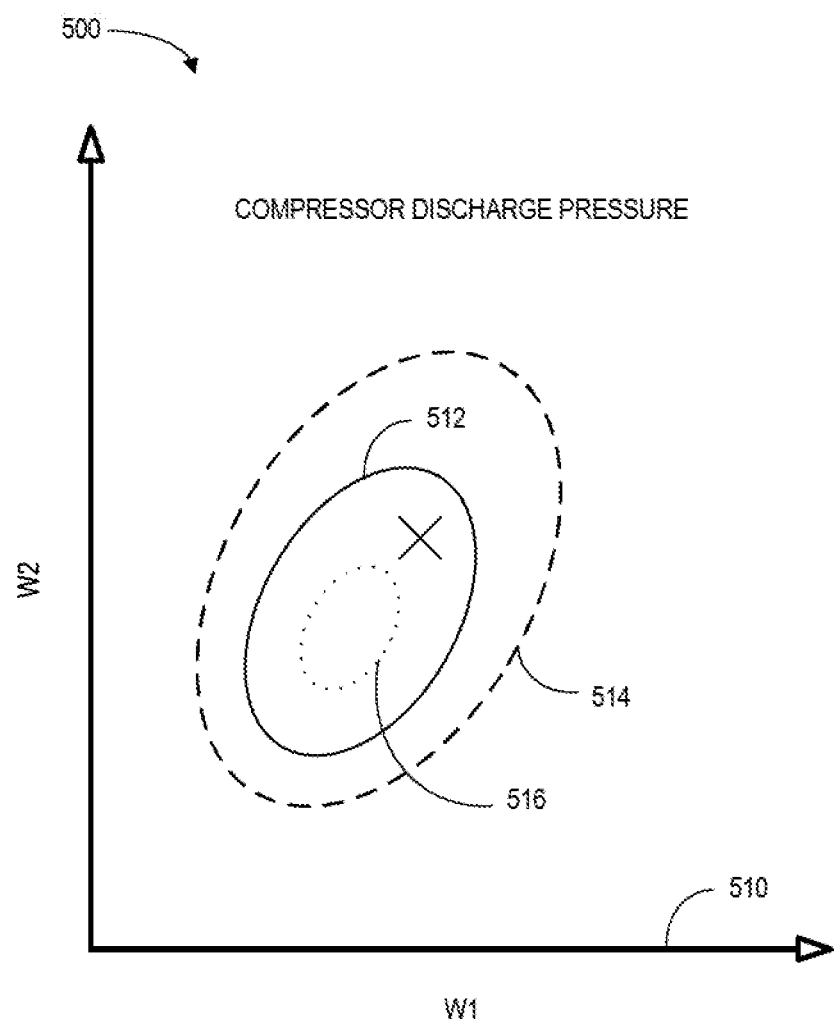
FIGS. 5 and 6 illustrate features, feature vectors, and decision boundaries in accordance with some embodiments.
Figure 6:
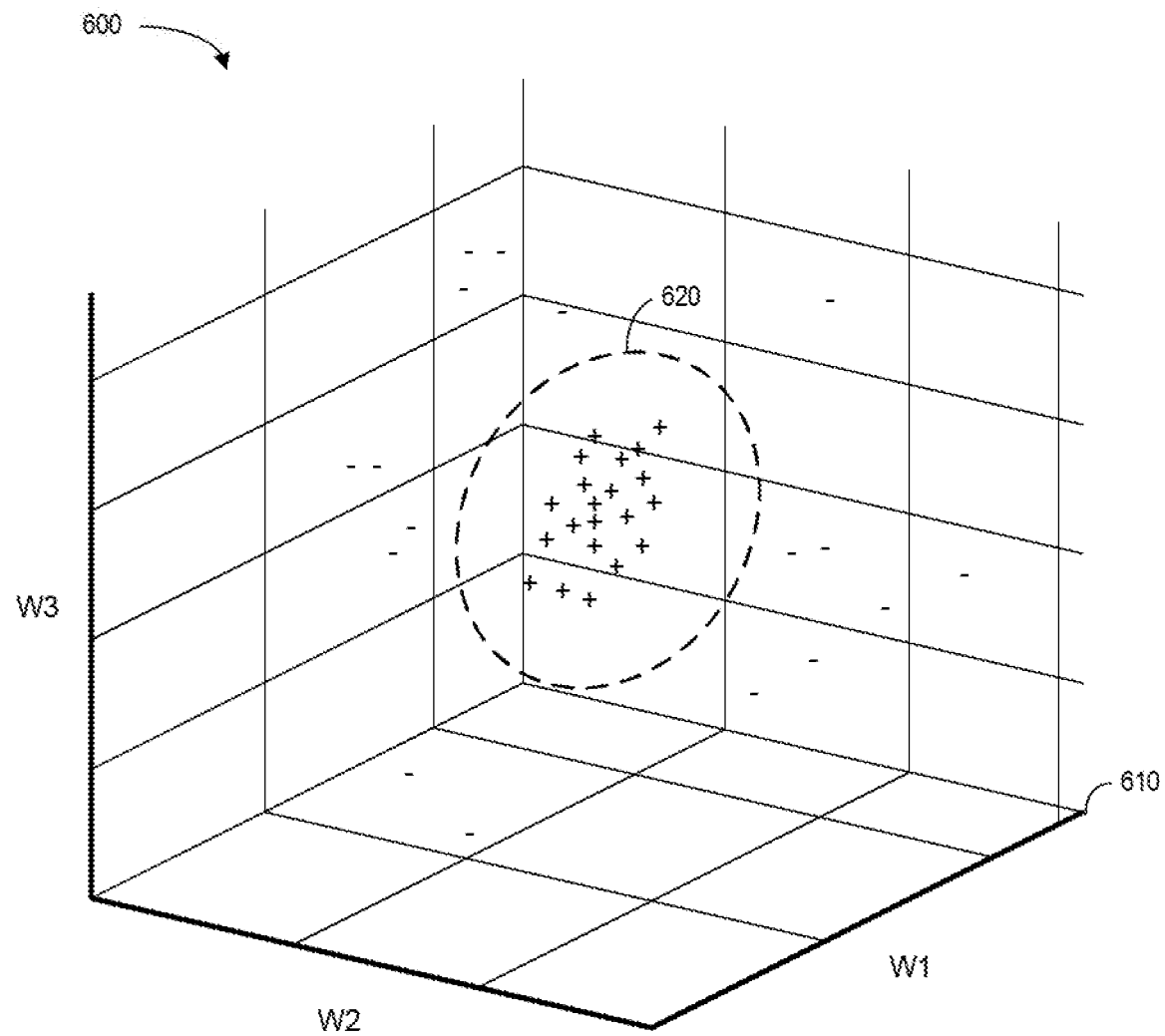

FIGS. 5 and 6 illustrate features, feature vectors, and decision boundaries in accordance with some embodiments. In particular, FIG. 5 illustrates 500 boundaries and feature vectors for a monitoring node parameter in accordance with some embodiments. A graph 510 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 510 illustrated in FIG. 5 represents compressor discharge temperature for a gas turbine but other values might be monitored instead (e.g., compressor pressure ratio, compressor inlet temperature, fuel flow, generator power, gas turbine exhaust temperature, etc.). The graph 510 includes an average boundary 512 (solid line), a minimum boundary 514 (dotted line), a maximum boundary 516 (dashed line), and an indication associated with current feature location for the monitoring node parameter (illustrated with an "X" on the graph 510). As illustrated in FIG. 5, the current monitoring node location is between the minimum and maximum boundaries (that is, the "X" is between the dotted and dashed lines). As a result, the system may determine that the operation of the industrial asset is normal (and no attack is being detected for that monitoring node). FIG. 6 illustrates 600 three dimensions of threat node outputs in accordance with some embodiments. In particular, a graph 610 plots monitoring node outputs during normal operation ("+") and when under attack ("−") in three dimensions, such as dimensions associated with PCA: w1, w2, and w3. Moreover, the graph 610 includes a dashed line indication of a normal operating space decision boundary 620.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or other machine based supervised learning techniques) may be used to generate decision boundaries. Since boundaries may be driven by measured data, defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 7:
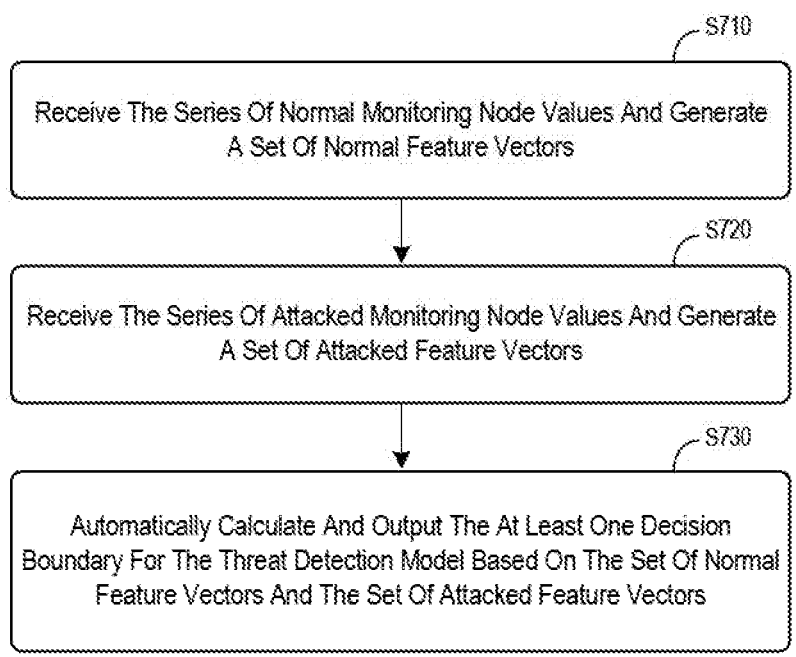
FIG. 7 is a threat detection model creation method according to some embodiments.

FIG. 7 illustrates a model creation method that might be performed by some or all of the elements of the system 100 described with respect to FIGS. 1 and 3. At S710, the system may retrieve, for each of a plurality of monitoring nodes, a series of normal values over time that represent normal operation of the industrial asset and a set of normal feature vectors may be generated. At S720, the system may retrieve, for each of the plurality of monitoring nodes, a series of attacked values over time that represent attacked operation of the industrial asset and a set of attacked feature vectors may be generated. The series of normal values might be obtained, for example, by DoE on an industrial control system associated with a power turbine, a jet engine, a locomotive, an autonomous vehicle, etc. At S730, a decision boundary may be automatically calculated and output for a threat detection model based on the sets of normal and attacked feature vectors. According to some embodiments, the decision boundary might be associated with a line, a hyperplane, a non linear boundary separating normal space from attacked space, and/or a plurality of decision boundaries. In addition, note that the threat detection model might be associated with the decision boundary, feature mapping functions, and/or feature parameters.

Thus, a system may classify the status of an industrial control system having a plurality of monitoring nodes (including sensor, actuator, and controller nodes) as being normal or under a cyber-attack. This may enable tailored, resilient, and fault-tolerant control remedies, including the deployment of virtual sensors, against cyber-attacks and faults.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technique such as PCA. Note that the features may be calculated over a sliding window of the signal time series and the length of the window (and the duration of the slide) may be determined from domain knowledge and inspection of the data or using batch processing.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, the output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, the weight may be found using the following equation (assuming that the basis sets are orthogonal):

$$w_j = (S - S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time threat detection, decisions may be made by comparing where each point falls with respect to a decision boundary that separates the space between two regions (or spaces): abnormal ("attack") space and normal operating space. If the point falls in the attack space, the industrial asset is undergoing an abnormal operation such as during a cyber-attack. If the point falls in the normal operating space, the industrial asset is not undergoing an abnormal operation such as during a cyber-attack. Appropriate decision zone with boundaries is constructed using data sets as described herein with high fidelity models. For example, support vector machines may be used with a kernel function to construct a decision boundary. According to some embodiments, deep learning techniques may also be used to construct decision boundaries.

Note that industrial processes may be controlled by Programmable Logic Controllers ("PLC") with Ethernet ports and IP addresses. Computer worms can live in the PLC and be inactive for many days and can replicate itself into many targets as it finds them. IT and OT protection mechanisms cannot completely keep a PLC safe and different approaches may be needed to protect critical infrastructures from more advanced viruses and allow for an industrial asset to operate (including critical functions) even when being attacked. In particular some embodiments described herein provide a multi-node virtual sensor to sustain operation of an industrial asset with no loss of critical function. The virtual sensor might utilize, for example, some or all of the following information to estimate true signals; (1) information from localization about which nodes were attacked independently, (2) features from monitoring nodes, and (3) a multi-node feature-based virtual sensor model trained apriori from the system data set. Estimated true signals may then be used in the respective nodes instead of attacked signals.

In a control system during operational normalcy, the system may receive time series signals from various monitoring nodes (i.e., sensor, actuator, controller, etc.). Consider a general system (e.g., cyber physical system, software system, bio-mechanical system, network system, communication system, etc.) that contains access to continuous streams of data in the form of time series signals from all these sensors. The time series signals might be generated from a set of output sensor nodes ("y"; both physical and virtual sensors already incorporated in the system), a set of actuator nodes ("u"; both hard and soft actuators generated from open or closed loop system), a set of output of controller nodes ("c"; controller node signals), and a set of reference nodes ("r"; reference signals). According to some embodiments, logicals are also considered as time series signals. Some or all combinations of these signals may be used for the purpose of accommodation with a virtual sensor. The virtual sensor matrix used for this purpose may, for example, estimate not only system sensor outputs, y, when an attack takes place to any of the sensor nodes, but also other signals to the control system; actuator node signals, u, controller node signals, c, reference signals, r, etc. Thus, the virtual sensor based accommodation system may provide an intelligent system that is designed to estimate signals that are corrupted/attacked from the healthy signals it receives.

Figure 8:
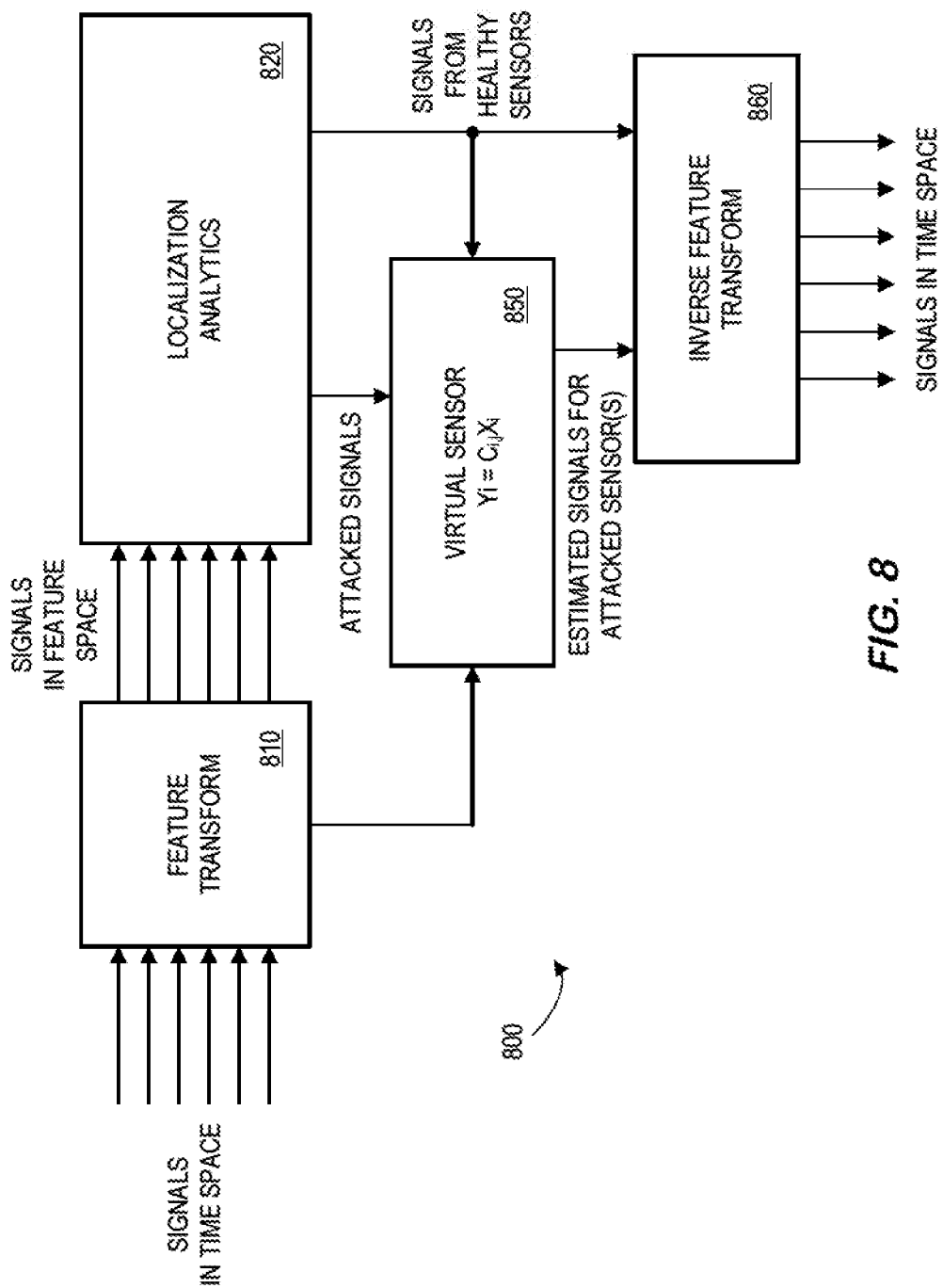
FIG. 8 is a high-level block diagram of a virtual sensor for neutralization in accordance with some embodiments.

Consider, for example, FIG. 8 which shows a schematic diagram of how the virtual sensor based accommodation system 800 might estimate true signals. According to some embodiments, the system 800 may handle many types of inputs from multiple heterogeneous data stream in a complex hyper connected system. Therefore, signals from time domain may be converted to features using Multi-Modal, Multi-Disciplinary ("MMMD") feature discovery framework and/or techniques such as linear PCA. Features may be arranged in vector form to estimate signals for attacked monitoring nodes as determined by localization analytics 820. A virtual sensor model 850 may include a matrix containing the model of the sensor which is then applied to feature vector to estimate the signals in feature space (e.g., after a feature transform 810). Estimated true values in feature space may then be transformed to time domain using inverse feature transform 860. Note that embodiments may operate in feature space and dynamically create virtual versions of the attacked sensors based on the healthy sensors that are left. Note that the virtual sensor 850 may utilize a lookup table, such as the table 900 illustrated in FIG. 9 including a virtual sensor matrix 910 and a signal being estimated 920, to create a value $Y_i = C_{i,j} X_j$ (where i represents the signals in feature space being estimated and j represents the number of attacked signals being estimated).

Figure 10:
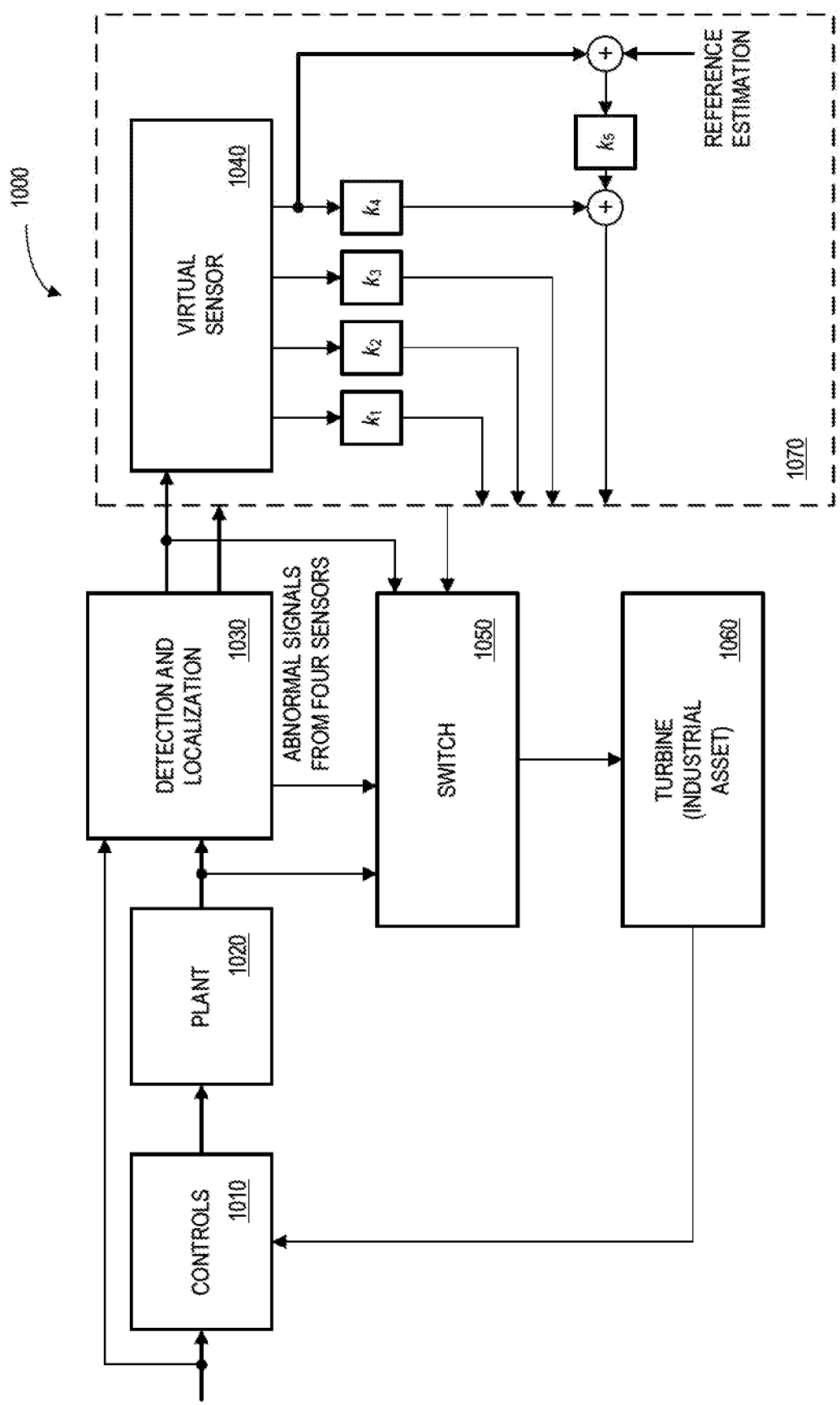
FIG. 10 illustrates an example of a virtual sensor implementation according to some embodiments.

FIG. 10 represents an architectural view of an accommodation system 1000 with a multi-node feature-based virtual sensor algorithm. Note that a set of output sensor nodes ("v"; both physical and virtual sensors already incorporated in the system), a set of actuator nodes ("u"; both hard and soft actuators generated from open or closed loop system), a set of output of controller nodes ("c"; controller node signals) and a set of reference nodes ("r"; reference signals) may be continuously monitored by a detection and localization algorithm 1030 based on information from controls 1010 and/or a plant 1020 (and, in some embodiments, a forecasting algorithm 1070). In the event of an attack, a forecasting algorithm may predict ahead of time that the operation of the system 1000 is moving closer to the decision boundary. In such an event, the forecasting algorithm may trigger the virtual sensor module 1040 to build a list of healthy sensor nodes in order to estimate the signals that may have been attacked. The virtual sensor 1040 at this stage prepares for the worst-case scenario with the assumption that all the nodes suggested by the forecasting algorithm have been attacked. The system may pick the corresponding C matrix (FIG. 9) to estimate the signals on the nodes that the forecasting algorithm suggested. Once the detection and localization algorithm detects that there is an attack, the switches associated with the input, reference, controller, and output signals are activated. This puts the signals estimated by the virtual sensor 1040 (e.g., k1, k2, k3, and k4 as modified by reference estimation k5) in the feedback control loop via a switch 1050 to the industrial asset 1060 and disables the attacked signals. This may lead to a degraded performance of the system but the system may still be operational. Performance may be degraded more as a large number of nodes are attacked since the number of available healthy sensors diminish. Once the localization algorithm provides an accurate list of sensor nodes that have been attacked (and separates the dependent attacks from the independent attacks), the virtual sensor 1040 can pick the appropriate C matrix considering only the independent attacks. This will lead, according to some embodiments, to a more accurate estimation procedure. Once the estimation is complete, the estimated signals are fed back into the control loop to achieve normal operation. Since the virtual sensor approach proposed in accordance with some embodiments will estimate even the actuator signals that are compromised, control signals will eventually see an improvement. Hence, some embodiments will reduce the need to have a separate controller (i.e., a redundant controller).

Note that Intelligent Dual systems and Triple Modular Redundant ("TMR") sensing systems have been used in modern turbine control systems. The goals of these redundancy sensing systems were aimed at improving reliability when sensors fail. They are not designed for sustaining operations in the presence of malicious attacks since attacks on industrial system are generally multi-prong (meaning effects are seen on more than one node at the same time). They are also not designed to handle an intelligent attack where the values of the sensor are being manipulated to cause harm, not simply a fail state.

Figure 11:
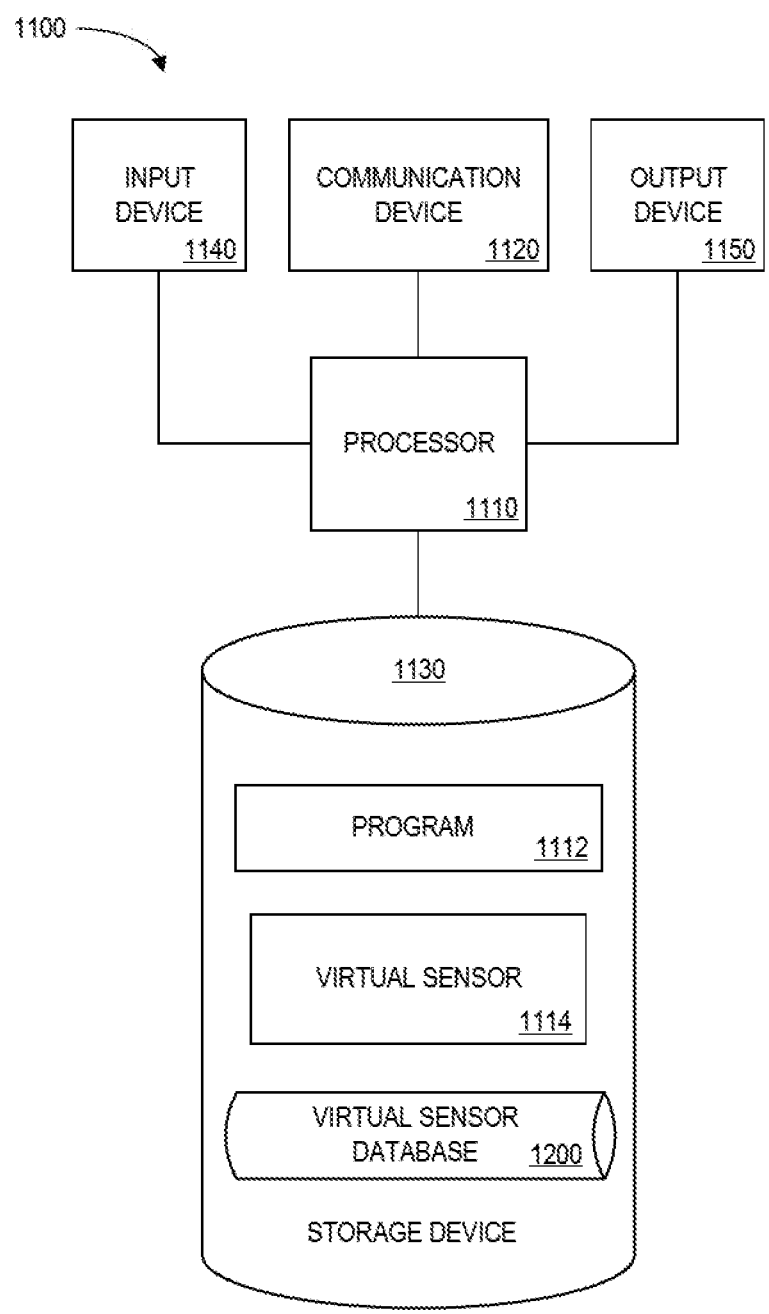
FIG. 11 is a block diagram of an industrial asset protection platform according to some embodiments of the present invention.

The embodiments described herein may be implemented using any number of different hardware configurations. For example, FIG. 11 is a block diagram of an industrial asset protection platform 1100 that may be, for example, associated with the systems 100, 300, 800 of FIGS. 1, 3 and 8 respectively. The industrial asset protection platform 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote monitoring nodes, user platforms, digital twins, etc. The industrial asset protection platform 1100 further includes an input device 1140 (e.g., a computer mouse and/or keyboard to input virtual sensor and/or predictive modeling information) and/an output device 1150 (e.g., a computer monitor to render a display, provide alerts, transmit recommendations, and/or create reports). According to some embodiments, a mobile device, monitoring physical system, and/or PC may be used to exchange information with the industrial asset protection platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a virtual sensor model 1114 for controlling the processor 1110. The processor 1110 performs instructions of the programs 1112, 1114, and thereby operates in accordance with any of the embodiments described herein. For example, the processor 1110 may estimate a series of virtual node values for an attacked monitoring node based on information received from monitoring nodes that are not currently being attacked. The processor 1110 may also replace a series of monitoring node values for the attacked monitoring nodes with the virtual node values.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the industrial asset protection platform 1100 from another device; or (ii) a software application or module within the industrial asset protection platform 1100 from another software application, module, or any other source.

In some embodiments (such as the one shown in FIG. 11), the storage device 1130 further stores a virtual sensor database 1200. An example of a database that may be used in connection with the industrial asset protection platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
FIG. 12 is a tabular portion of a virtual sensor database in accordance with some embodiments.

Referring to FIG. 12, a table is shown that represents the virtual sensor database 1200 that may be stored at the industrial asset protection platform 1100 according to some embodiments. The table may include, for example, entries identifying industrial assets to be protected. The table may also define fields 1202, 1204, 1206, 1208, 1210, 1212 for each of the entries. The fields 1202, 1204, 1206, 1208, 1210, 1212 may, according to some embodiments, specify: an industrial asset identifier 1202, an industrial asset description 1204, a virtual sensor identifier 1206, a matrix 1208, description 1210, and a status 1212. The virtual sensor database 1200 may be created and updated, for example, when a new physical system is monitored or modeled, an attack is detected, etc.

Figure 13:
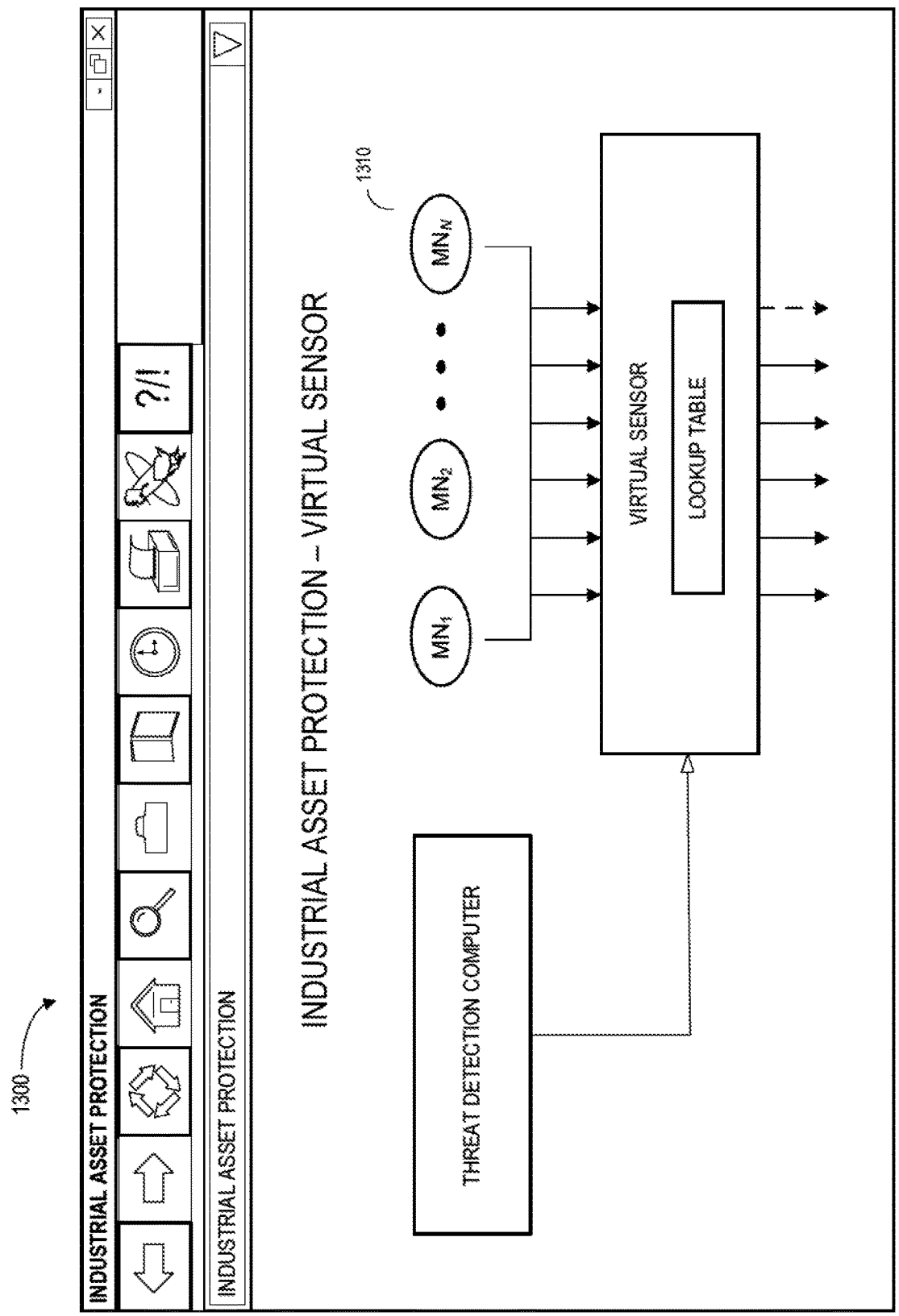
FIG. 13 is a virtual sensor display according to some embodiments.

The industrial asset identifier 1202 and description 1204 may define a particular machine or system that will be protected. The virtual sensor identifier 1206 might be a unique alphanumeric code identifying a particular sensor being modeled for the industrial asset. The matrix 1208 might be associated with a lookup table, the description 1210 might indicate what sensor is being estimated, and the status 1212 might indicate, for example, whether the associated monitoring node is operating normally or is currently undergoing a cyber-attack. FIG. 13 is an example of virtual sensor display 1300 that might be used, for example, to provide information 1310 to an operator and/or to provide an interactive interface allowing an operator to adjust virtual sensors as appropriate.

Thus, embodiments may improve cyber security and accommodate critical functionality associated with an industrial asset. Moreover, embodiments may by-pass signals from attacked sensors using estimated signals created using data from healthy sensors just before the attack took place. This approach may allow for a correction mechanism to sustain the operations while alerting the operators about the cyber-attack. Increasing machine intelligence through multi-node feature-based virtual sensors may provide cyber-safe operations because of its abilities to estimate multiple attacked nodes simultaneously from an extremely large number of healthy nodes. A properly designed system, linking all critical nodes can provide increased resilience to attacks. Moreover, embodiments may result in an ability to install fewer redundant sensors due to the highly accurate virtual sensors described herein.

According to some embodiments, one may construct a multi-node virtual sensor in a hyper-connected network of control system signals from sensors, actuators and controllers. Unlike normal approaches used in industrial control systems, some embodiments may use signals from a large number of monitoring nodes as inputs to estimate the signals for single or multiple faulty or attacked nodes. The signals may be generated from output sensor nodes (e.g., physical and/or virtual sensors), actuator nodes (e.g., hard and/or soft actuators generated from open or closed loop system), controller nodes (e.g., controller node signals), reference nodes (e.g., reference signals), and the like. Thus, the Feature-based Multi-node Virtual ("FMV") sensing may use system-wide information simultaneously and hence can be accurate.

Figure 14:
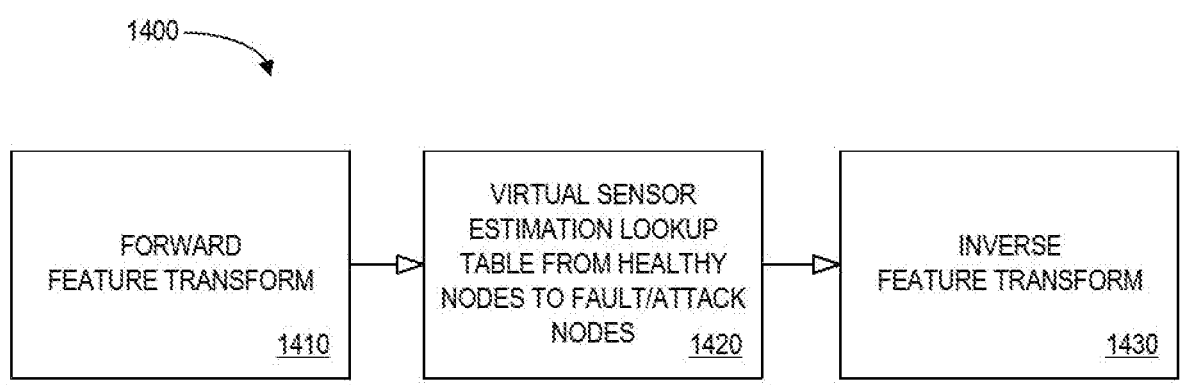
FIG. 14 is a high-level block diagram of components associated with a feature-based, multi-node virtual sensing system for cyber-physical system in accordance with some embodiments.

An FMV sensor may incorporate an algorithm 1400 that uses many computational blocks as shown in FIG. 14. In particular, the blocks may include a forward feature transform 1410, a virtual sensor estimation lookup table from healthy nodes to faulty/attacked nodes 1420, and an inverse feature transform 1430. At its core, a sensor estimates the features of signals from nodes (for this purpose all nodes may be referred to as "sensors") that are faulty or under attack from the features of the signals from other nodes (i.e., sensors) that are healthy or not under attack. The mapping between various combinations of the set of signals being estimated and the set of healthy signals may be stored in a lookup table. The lookup table may be computed, for example, in feature space during training using signals from multiple healthy nodes. Once the lookup table is ready, the FMV sensor can be used in real time for the intended purpose.

Figure 15:
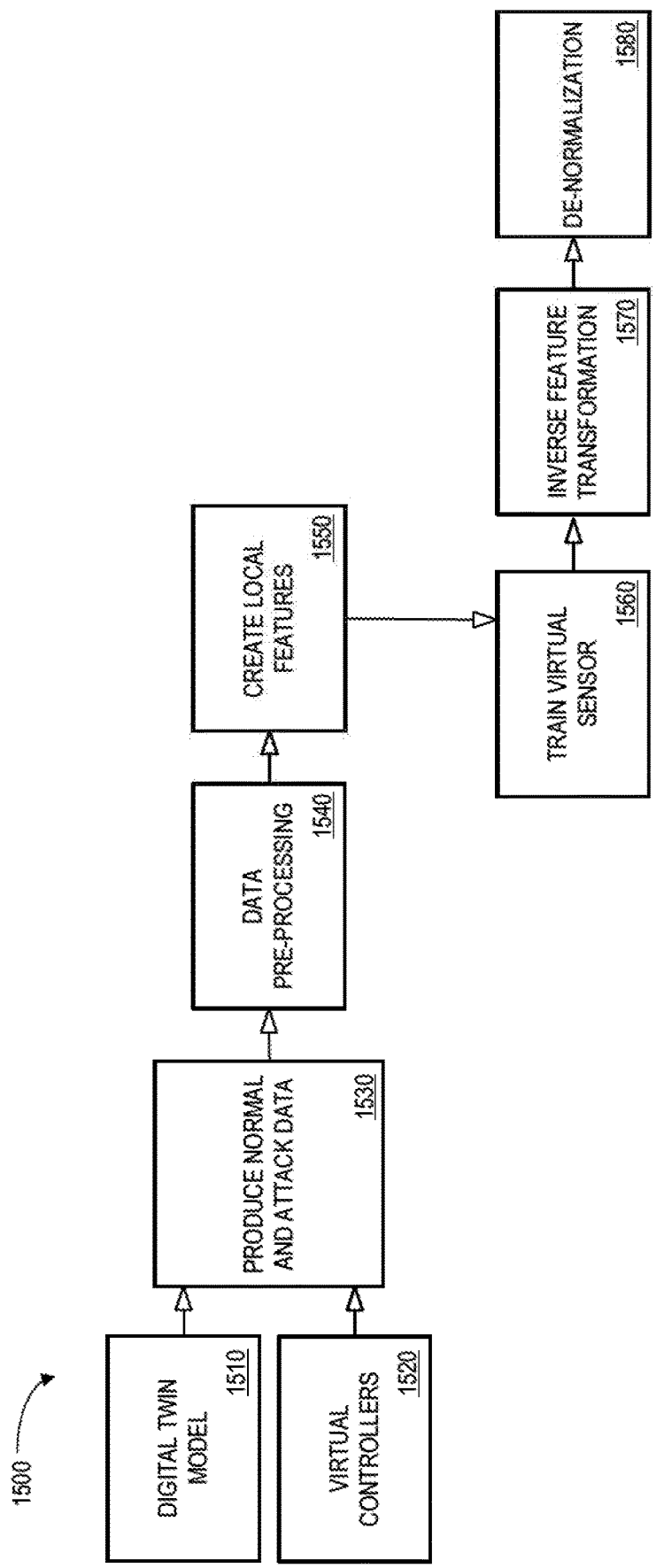
FIG. 15 is a more detailed diagram of a feature-based, multi-node virtual sensor training phase process according to some embodiments.

FIG. 15 shows various components and process steps for training the sensor from a large set of data. In particular, the system 1500 produces normal and attack data 1530 using a digital twin 1510 (e.g., a high-fidelity, physics-based model) and virtual controllers 1520. The data set can be created from DoE runs on the digital twin model 1510 with attacks, faults and normal operational state or directly from operational data. Data pre-processing 1540 may then be performed to create local features 1550 that can be used to train the virtual sensor 1560. Next, an inverse feature transformation may be executed to generate estimated time series data and de-normalization 1580 may be performed.

According to some embodiments, a sensing approach may handle many types of inputs from multiple heterogeneous data stream in a complex hyper connected system. This will enable multiple redundancies inside the computational blocks which are needed to estimate accurate signals from the sensor. To do this, continuous signals from time domain are converted to feature space using a MMMD feature discovery framework or PCA type techniques. Only invertible features from MMMD feature discovery process are considered for this purpose.

A "feature" may refer to, for example, mathematical characterizations of data and is computed in each overlapping batch of the data stream. Examples of features as applied to sensor data can be classified broadly into knowledge-based, shallow and deep features. Knowledge-based features use domain or engineering knowledge of physics of the system to create features. These features can be simply statistical descriptors (e.g., max, min, mean, variance), and different orders of statistical moments, calculated over a window of a time-series signal and its corresponding FFT spectrum as well. Shallow features are from unsupervised learning (e.g., k-means clustering), manifold learning and nonlinear embedding (e.g., isoMap, LLE), low dimension projection (e.g., PCA, independent component analysis), and neural networks, along with genetic programming and sparse coding.

Deep learning features (e.g., auto encoders) may be generated using deep learning algorithms which involve learning good representations of data through multiple levels of abstraction. By hierarchically learning features layer-by-layer, with higher-level features representing more abstract aspects of the data, deep learning can discover sophisticated underlying structure and features. Still other examples include logical features (with semantic abstractions such as "yes" and "no"), and interaction features. Logical features might not be required for FMV sensors in some embodiments, but can be used for diagnostic purpose.

One example of a feature transform, referred to as Linear PCA, that may be used to construct an example FMV sensor will now be described. Note that this approach can be extended to include various other features described above. The Linear PCA based feature transform may project the time series signals (e.g., 15 second batch length) onto a set of orthonormal basis vectors. The procedure is described by the following equations:

$$y = y_0 + \sum_{j=1}^{M} w_j \Psi_j$$

-continued $$w_j = \Psi_j^T (y - y_0)$$

The weights ($w_j$'s) represent the features of the time series signal y in the feature space with reduced dimensionality Prior to the feature transformation, the time series signals may be pre-processed using normalization.

With respect to a virtual sensor estimator, suppose $w_j^{(i)}$ is the j-th feature of the i-th sensor. The virtual sensor estimates the features of a given sensor(s) from the features of the other sensors. For example, the j-th feature of the first sensor is estimated from the features of the other sensors in the following way:

$$\hat{w}_j^{(1)} = C_j^{(1)} \begin{bmatrix} w_j^{(2)} \\ w_j^{(3)} \\ \ldots \\ w_j^{(n)} \end{bmatrix}$$

In this equation, n is the number of sensors and $C_j^{(1)}$ is a matrix with one row and n−1 columns. Suppose each sensor is represented by m features. Then, the estimation procedure can be represented by the following equation:

$$\begin{bmatrix} \hat{w}_1^{(1)} \\ \hat{w}_2^{(1)} \\ \ldots \\ \hat{w}_m^{(1)} \end{bmatrix} = \begin{bmatrix} C_1^{(1)} & 0 & 0 \\ 0 & \ldots & 0 \\ 0 & 0 & C_m^{(1)} \end{bmatrix} \begin{bmatrix} w_1^{(2)} \\ w_1^{(3)} \\ \ldots \\ w_1^{(n)} \\ \vdots \\ w_m^{(2)} \\ w_m^{(3)} \\ \ldots \\ w_m^{(n)} \end{bmatrix}$$

where:

$$C = \begin{bmatrix} C_1^{(1)} & 0 & 0 \\ 0 & \ldots & 0 \\ 0 & 0 & C_m^{(1)} \end{bmatrix}_{m \times m(n-1)}$$

$$W_y^T = [\hat{w}_1^{(1)} \quad \hat{w}_2^{(1)} \quad \ldots \quad \hat{w}_m^{(1)}]_{m \times 1}$$

$$W_x^T = [w_1^{(2)} \quad w_1^{(3)} \quad \ldots \quad w_1^{(n)} \quad \ldots \quad w_m^{(2)} \quad w_m^{(3)} \quad \ldots \quad w_m^{(n)}]_{m(n-1) \times 1}$$

$$W_y = CW_x$$

The quadratic and cubic terms of the features in $W_x$ can be included to improve the estimation accuracy. Thus, for example, one could define $W_x^T$ as equaling:

$$[w_1^{(2)} w_1^{(3)} \ldots w_1^{(n)} (w_1^{(2)})^2 \ldots (w_1^{(n)})^2 (w_1^{(2)})^3 \ldots w_m^{(n)} \ldots (w_m^{(2)})^3 \ldots (w_m^{(n)})^3]_{3m(n-1) \times 1}$$

The matrix C is computed during the training phase using regression from the data set which is described next.

With respect to linear least squares regression consider the prior equation for $W_y$:

$$W_y^T = W_x^T C^T$$

$$W_x W_y^T = W_x W_x^T C^T$$

$$C^T = (W_x W_x^T)^{-1} W_x W_y^T$$

That last equation represents the linear least squares based regression solution to compute the C matrix. One can manually compute the C matrix as shown in the equation or one could use the built-in function of MATLAB called the 'nlinfit' for regression. At the end, a virtual sensor lookup table may be constructed using the C matrix for various combinations of the signals being estimated.

With respect to the virtual sensor lookup table, the system may build a lookup table with matrices $C_{ij}$ where j indicates the number of signals being estimated by the virtual sensor and i indicates the signals being estimated. For instance, in the case of gas turbine data, FIG. 9 represents an example virtual sensor lookup table 900. As an example, $C_{1,1}$ in FIG. 9 corresponds to the virtual sensor that estimates the DWATT signal while $C_{15,2}$ corresponds to the virtual sensor that estimates two signals namely CPD and CTD.

With respect to an inverse feature transform (illustrated in FIG. 15) 1570, it may need to be performed to map the feature vectors back to the input space. This step may be important during the training phase 1560 (i.e., while generating accurate virtual sensor lookup table) to evaluate the performance of the virtual sensor lookup table. In the verification step, virtual sensor lookup table output is used to verify how close the estimated sensor values are to the original sensor values in the input space.

When PCA is performed to obtain the features of the time series signals, the following procedure is used to map the features back to the input space:

$$\hat{y} = y_0 + \sum_{j=1}^{M} \hat{w}_j \Psi_j$$

Here $\hat{y}$ represents the estimated signal in the input space and $\widehat{w_j}$ is the j-th feature of the given sensor signal estimated by the virtual sensor algorithm. Given that the PCA based feature transform is a linear map, the inverse map from the feature space to the input space is well defined. The pre-image for each feature vector exists and is unique.

Figure 16:
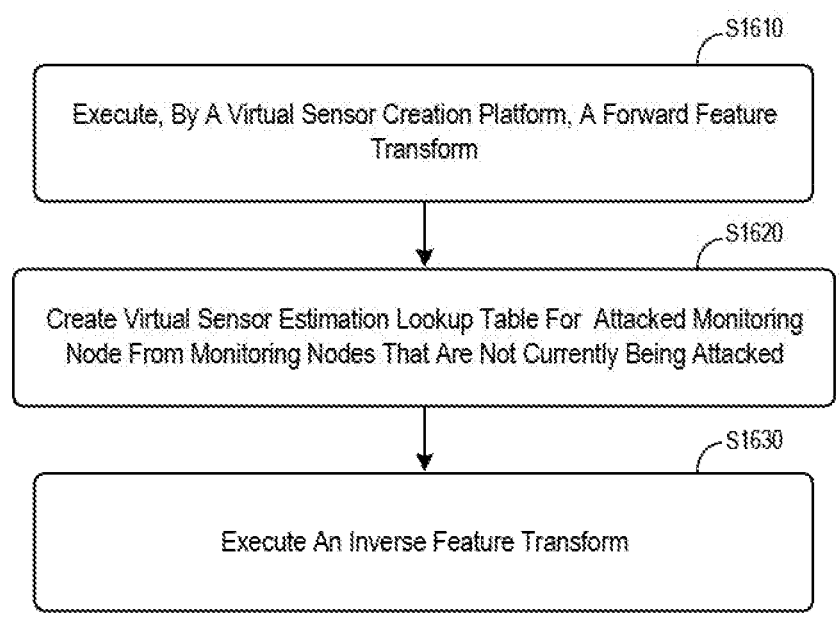
FIG. 16 is an example of a method associated with an algorithm for a feature-based, multi-node virtual sensor according to some embodiments.

FIG. 16 illustrates a virtual sensor creation method that may be performed in accordance with some embodiments. At S1610, a virtual sensor creation platform may execute a forward feature transform (e.g., creating local features and vectors after data pre-processing is performed on normal space and attacked space data). At S1620, the system may create a virtual sensor estimation lookup table for an attacked monitoring node from monitoring nodes that are not currently being attacked. At S1630, an inverse feature transform may be executed to generate estimated time series data (which may then be de-normalized).

Figure 17:
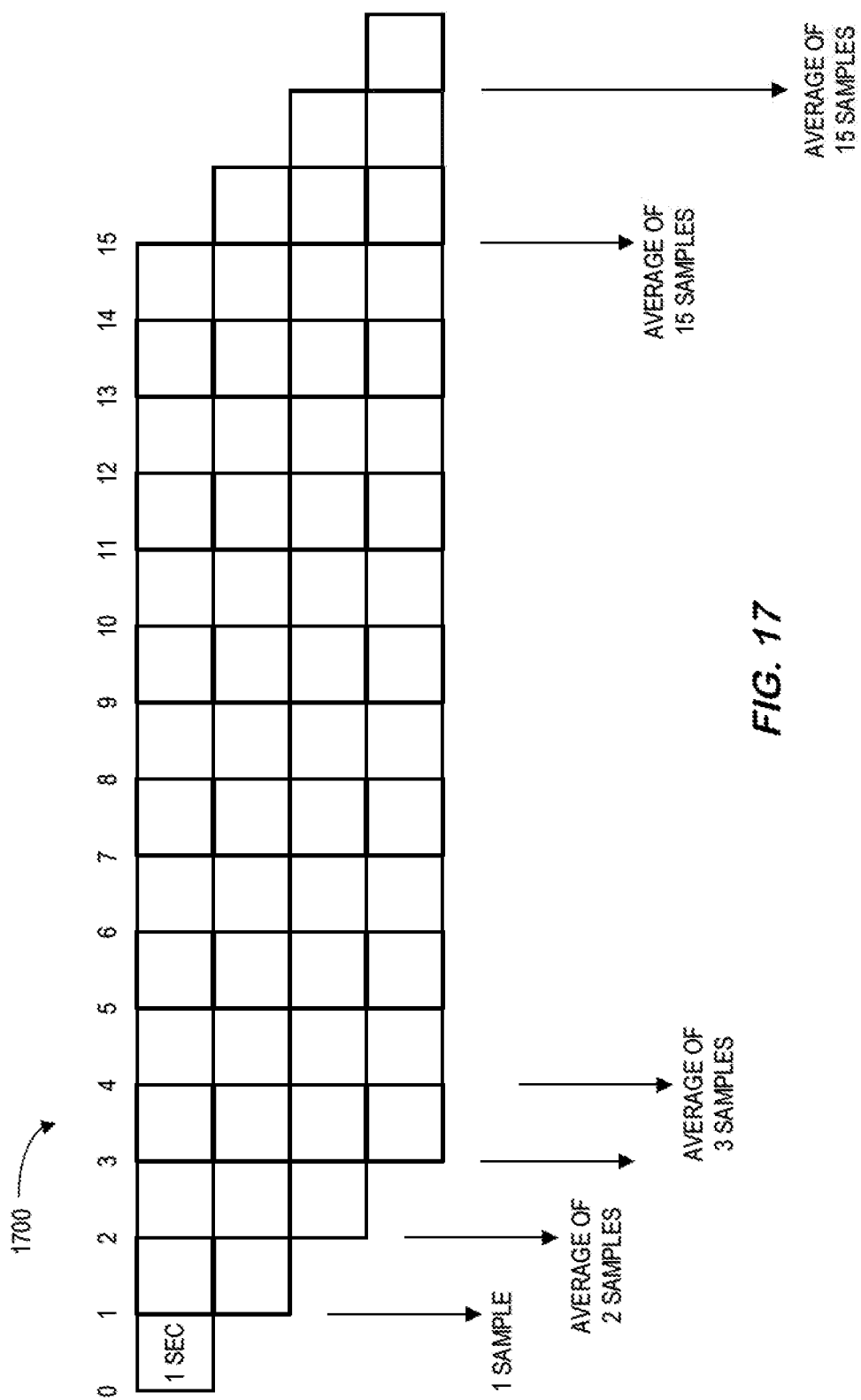
FIG. 17 illustrates a sliding window technique for real-time measurements in accordance with some embodiments.

FIG. 17 illustrates how input signals may be processed in a sliding window 1700 during real-time detection. The virtual sensor algorithm performs smoothing of the time series signal using the sliding window technique. Consider for example a window of size 15 seconds, then at the end of the batch (say, the first second for this purpose), the system has one sample of the data from the FMV sensor time series signal. At the end of two seconds, the system has the average of the sample at the 1st second and the sample at the 2nd second. Similarly, at the end of 15 seconds, the system has the average of all the samples in the last 15 seconds. Mathematically, this can be expressed as follows:

$$s_i = 0 \; \forall \; i \leq 0$$

-continued $$s_i = \frac{1}{i}\sum_{j=0}^{i} s_{i-j} \text{ for } i < n_{win}$$

$$s_i = \frac{1}{n_{win}}\sum_{j=0}^{n_{win}} s_{i-j} \text{ for } i \geq n_{win}$$

$$s_i = \frac{1}{N - n_{win} + 2}\sum_{j=0}^{n_{win}} s_{i-j} \text{ for } i \geq N - n_{win} + 2$$

Here $n_{win}$ is the size of the window, $s_i$ is the signal value at time i and N is the total number of samples.

The goal in the training phase is to compute the basis vectors for the linear PCA and a C matrix as in equation for $W_y$ that estimates the features of a given sensor(s) using the features of the remaining sensors. If other types of features are used, then a feature discovery process is adopted to find the best features for this purpose. For PCA features, the system may need to compute principal components which require computation of orthonormal basis set.

According to some embodiments, the basis vectors $\psi_j$ are computed for a batch of 45 seconds in the following manner for a gas turbine data set. Suppose $X^{(m)}$ represents the m-th training data point with 45 second long time series data. The 45 second window might be chosen, for example, to best capture the system dynamics. However, in real time, the transients in the data occur within a much shorter window. Hence, to track the transients with higher accuracy, the system may segment this 45 second data window into three 15 second windows. Thus, if the training data before segmentation is represented as:

$$X = \begin{bmatrix} X_1^{(1)} & \ldots & X_1^{(m)} \\ \vdots & \ldots & \vdots \\ X_{45}^{(1)} & \ldots & X_{45}^{(m)} \end{bmatrix}$$

then after the segmentation, the training data is represented as:

$$\hat{X} = \begin{bmatrix} X_1^{(1)} & \ldots & X_1^{(m)} & X_{16}^{(1)} & \ldots & X_{16}^{(m)} & X_{31}^{(1)} & \ldots & X_{31}^{(m)} \\ \vdots & \ldots & \vdots & \vdots & \ldots & \vdots & \vdots & \ldots & \vdots \\ X_{15}^{(1)} & \ldots & X_{15}^{(m)} & X_{30}^{(1)} & \ldots & X_{30}^{(m)} & X_{45}^{(1)} & \ldots & X_{45}^{(m)} \end{bmatrix}$$

$\hat{X}$ is used for computing the basis vectors. These basis vectors map the 15 dimensional data to a lower dimensional space (for example, 5 dimensions) represented by the basis vectors or Principal Components.

The second step in the training phase involves computing the C matrix in the equation for $W_y$. During the training phase, $W_x$ is a matrix containing the features of the healthy sensors from various training samples as the columns of the matrix. Thus, $W_y$ represents the matrix with the estimated features of the given sensor(s). The first column of $W_y$ corresponds to the estimated features of the given sensor(s) for the training sample 1, the second column of $W_y$ corresponds to the estimated features of the given sensor(s) for the training sample 2 and so on.

When a new test sample arrives, the sensor(s) whose features may need to be estimated is(are) identified. The corresponding C matrix is picked from the virtual sensor lookup table. The new sample is first normalized using various normalization techniques. The normalized sample is then mapped to the feature space using one of the feature transformation techniques described earlier. The equation for $W_y$ is applied on the thus obtained feature space sample using the chosen C matrix. The result of that equation is the features of the given sensor(s) estimated by the virtual sensor lookup table. The estimated features may then be mapped to the input space using the corresponding inverse feature transform.

FMV sensor provides a simple and efficient solution to exploiting these system-wide redundancies in estimating the sensor signals with higher accuracy. Thus, embodiments described herein provide a feature-based framework using a substantial number of inputs from healthy sensors to reconstruct a signal expected from faulty or attacked nodes and, as a result, provides opportunities for creating highly reliable systems. According to some embodiments, a method to sustain the operation of a cyber-physical system with no loss of critical function during a cyberattack may be facilitated using the virtual sensor. Another application may be associated with fault accommodation in which a successful implementation regains the operation lost from a fault occurrence. Note that embodiments described herein may also reduce costs associated with a system by optimizing a number of needed redundancies (i.e., intelligent dual or triple mode redundancies).

Figure 18:
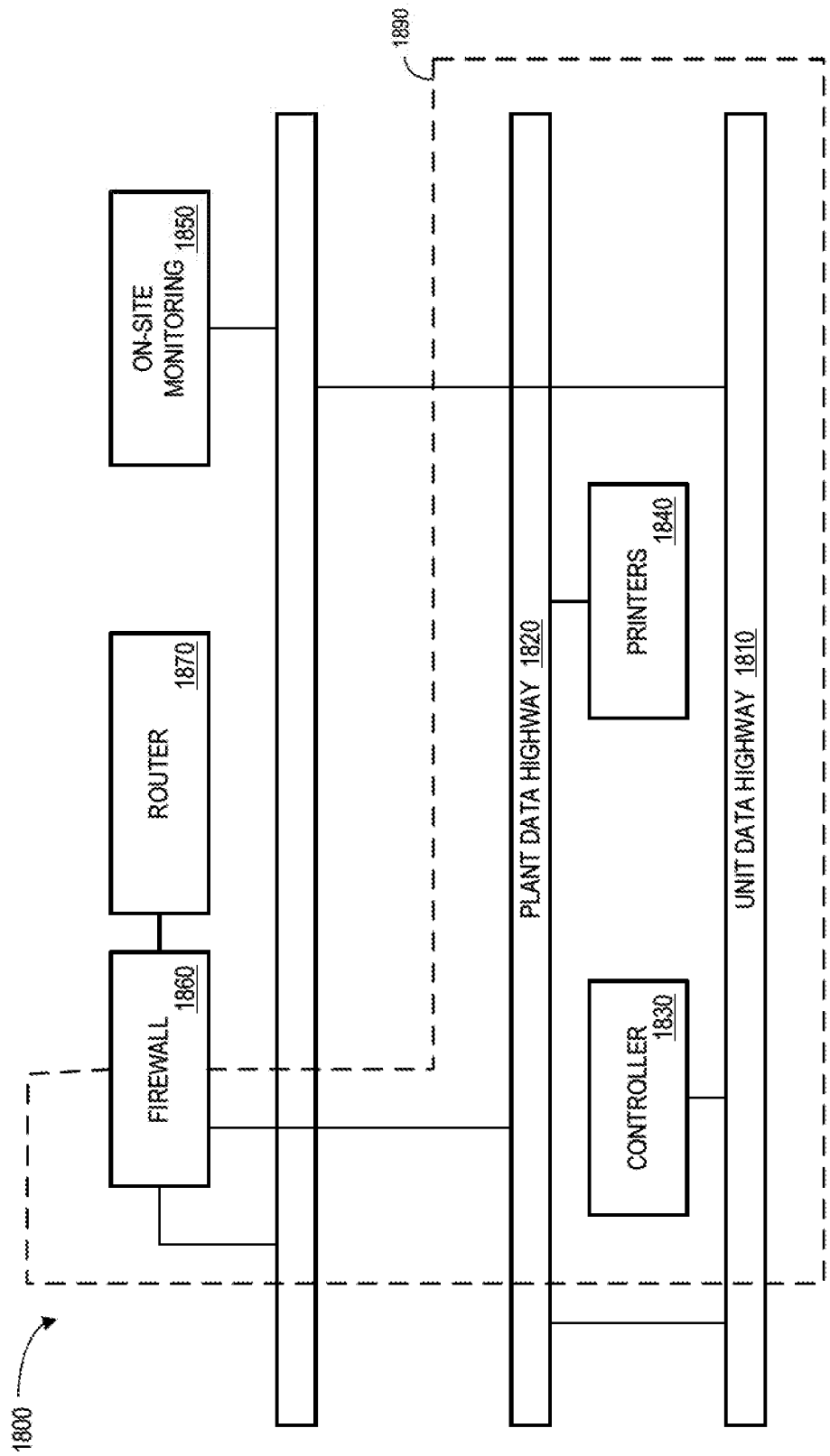
FIG. 18 is a diagram of an industrial control system network according to some embodiments.

According to some embodiments, a system and method may be provided for monitoring communication flow between inbound network packets and an endpoint. The system may function based on an input from a subsystem to moderate signals sent past the system. More specifically (applied to an Industrial Control System ("ICS")), the system may operate on-site at the network, potentially the Unit Data Highway ("UDH") and monitor any data packet that would be sent to an industrial controller. FIG. 18 illustrates a system 1800 that might be associated with a common ICS network, where there are multiple network branches that segregate applications. The system 1800 includes a UDH 1810 (e.g., associated with a controller 1830), a Plant Data Highway ("PDH") 1820 (e.g., associated with printers 1840), an on-site monitoring element 1850, firewall 1860, router 1870, etc. The system 1800 may parse each data packet and evaluate the signal tag, examples such as CPD, CTIM, DWATT, FQG and the values of each packet. The system 1800 may then cross reference the value with the system that produces surrogate signals (also called virtual sensing signals or soft sensing signals).

As shown by the dashed line in FIG. 18, an electronic security perimeter 1890 may be established using IT firewalls. The perimeter 1890 may separate the connection from the control system network and the outside connection to the Internet. This is a modern network layout; many installed units do not have such high-security practices. Note that the Human-Machine Interfaces ("HMIs") and other appliances can have a connection to the UDH 1810, which is the branch of the network that the controllers connect to. By gaining access to an HMI using traditional IT exploits, an unauthorized party can obtain direct access to the controller 1830.

Figure 19:
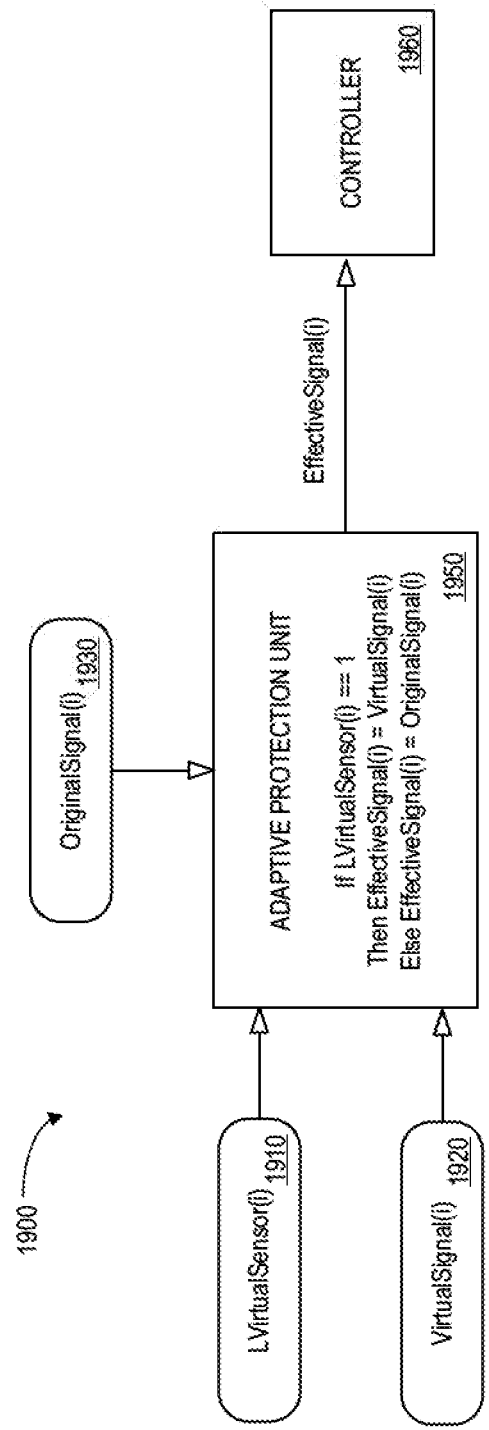
FIG. 19 is a system-level protection unit functional explanation according to some embodiments.

Regardless of hardware architecture, an algorithm/computing platform sitting in the communication path from any endpoint to the controller 1830 could enable adaptive system-level protection of the controller via virtual sensor integration. The adaptive system-level protection unit may function to filter the signals the controller sees. The high-level function is detailed by the system-level protection unit functional explanation 1900 of FIG. 19. In particular, a system-level Adaptive Protection Unit ("APU") 1950 may act as a signal filter to a controller 1960. An original signal 1930 can pass through the APU if the virtual sensor subsystem has determined the original sensor to be valid (as indicated by LVirtualSensor(i) 1910). If the virtual sensor subsystem determines that the original sensor is not close to the estimated value, then the virtual sensor subsystem will transmit a logical to the APU (LVirtualSensor(i) 1910), which will then prompt the APU to switch the output array of signals (Effective Signal) to the corresponding i-th entry to the value of the virtual sensor VirtualSignal(i) 1920. This may be performed in real-time and may be control software agnostic. Therefore, control software changes can be avoided, which provides extensive time savings.

Figure 20:
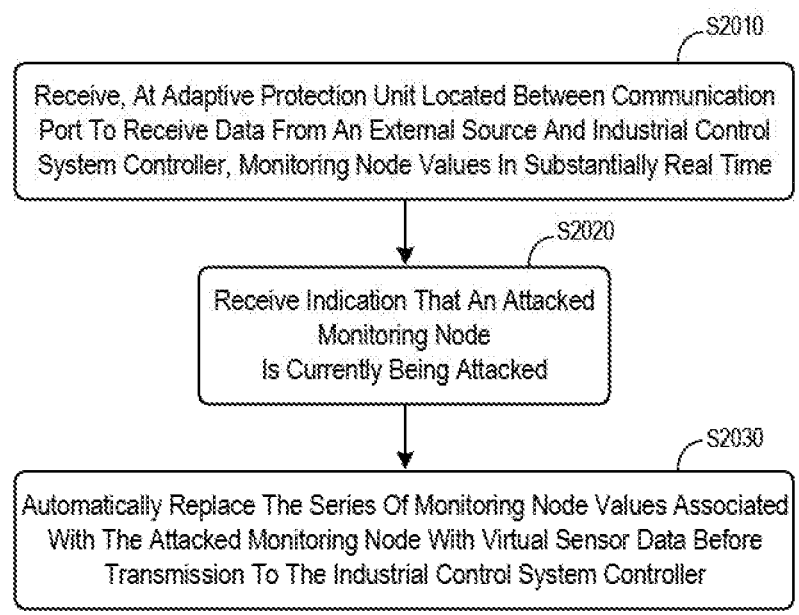
FIG. 20 is an example of a method in accordance with some embodiments.

FIG. 20 illustrates an adaptive protection unit method according to some embodiments. At S2010, an adaptive protection unit located between a communication port (to receive data from an external source) and an industrial control system controller may receive the monitoring node values in substantially real time. At S2020, an indication may be received that an attacked monitoring node is currently being attacked. At S2030, the adaptive protection unit may automatically replace the series of monitoring node values associated with the attacked monitoring node with virtual sensor data before transmission to the industrial control, system controller.

Figure 21:
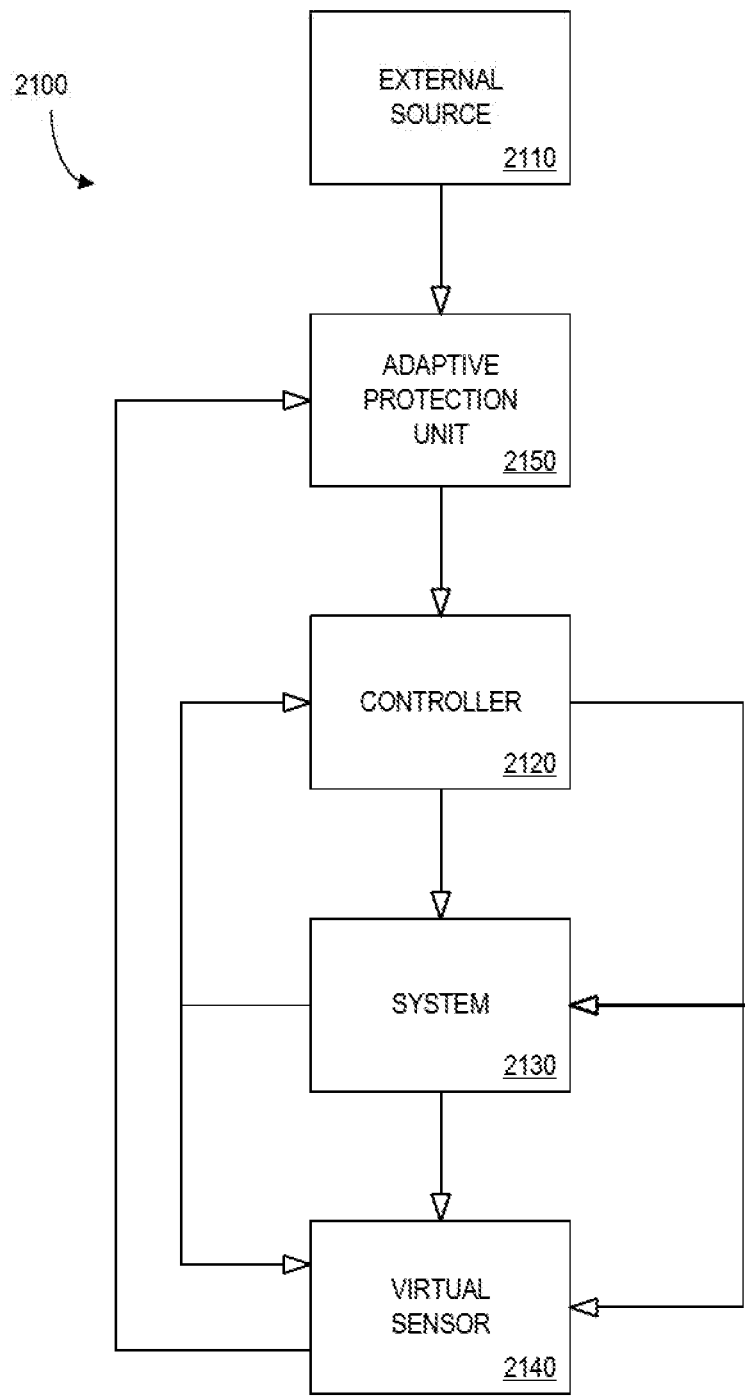
FIGS. 21 through 23 demonstrate various architectures to incorporate an adaptive protection unit according to some embodiments.
Figure 22:
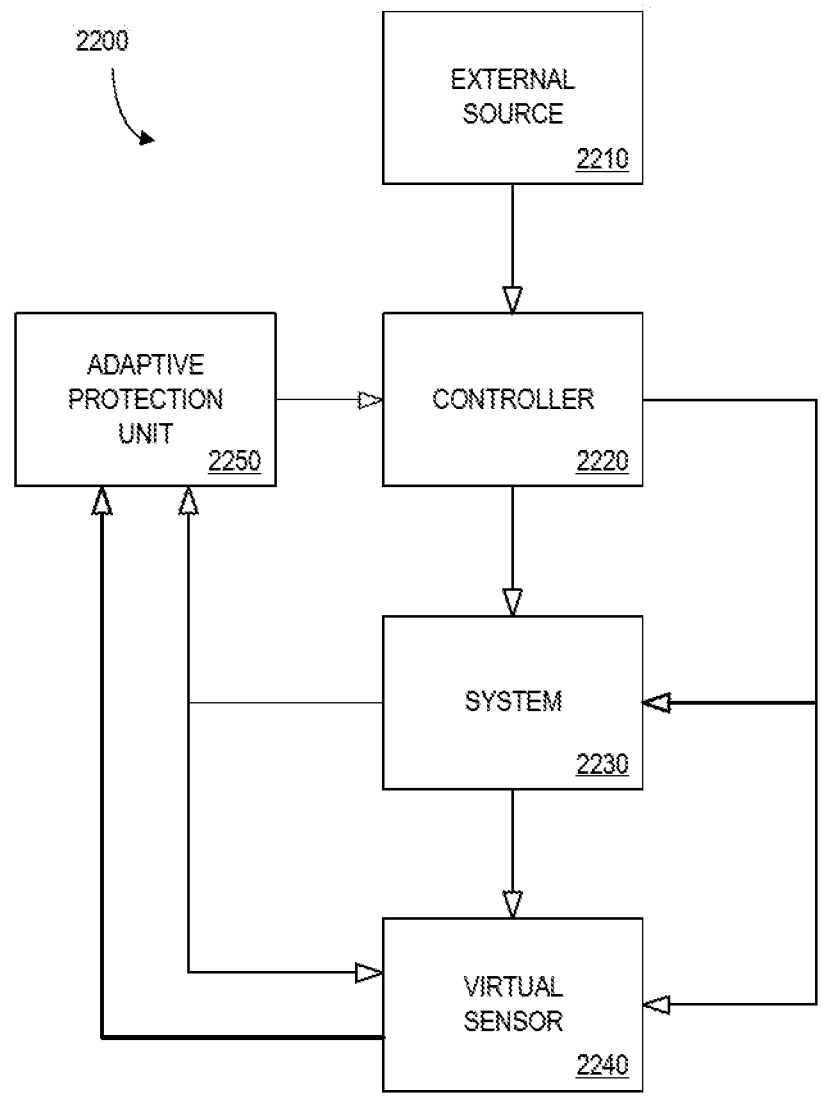
Figure 23:
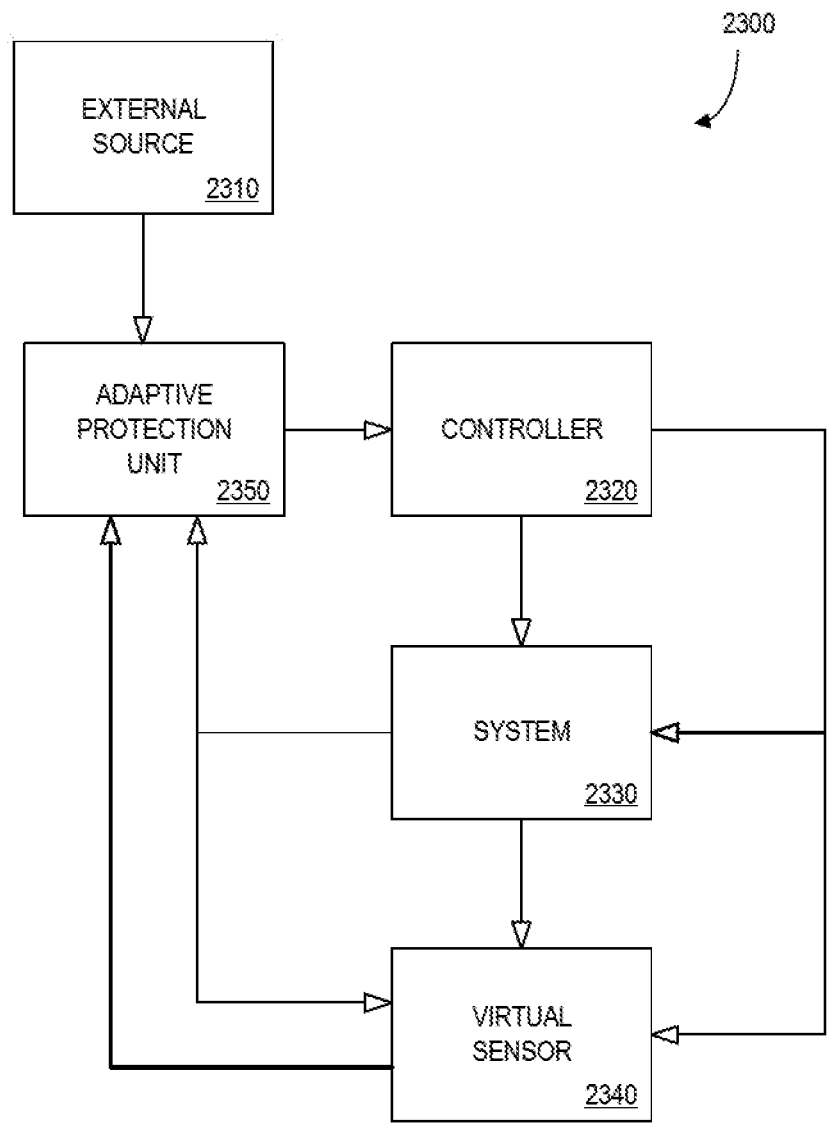

Several example architectures are shown in FIGS. 21 through 23 in accordance with various embodiments. In the system 2100 of FIG. 21, an adaptive protection unit 2150 sits directly between an external source 2110 and a controller 2120. The controller 2120 transmits information to a system 2130 and a virtual sensor 2140. As a result, the adaptive protection unit 2150 can act in the communication path between an external source 2110 and the controller 2120 (such as an HMI). In the system 2200 of FIG. 22, which includes an external source 2210 and a virtual sensor 2240, the adaptive protection unit 2250 is implemented in the communication path between the system 2230 and the controller 2220. In the system 2300 of FIG. 23, which includes a controller 2320 and a virtual sensor 2340, the adaptive control unit 2350 is implemented in the communication path of both an external source 2310 and the system 2330.

In the event that a signal of a control system network is attacked or corrupted, the network may have no way of accommodating to the corrupt signal. This can lead to degraded performance or catastrophic failure in the case of a cyber-attack. The adaptive protection unit may allow for the control system to neutralize the corrupt signal in real-time and continue functioning seamlessly. Thus, embodiments may help satisfy governmental security regulations. Moreover, embodiments may protect assets from ICS cyber-attacks.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
a plurality of monitoring nodes associated with the industrial asset, each monitoring node generating a series of monitoring node values over time that represent operation of the industrial asset; and
a virtual sensor creation platform comprising one or more hardware processors, the virtual sensor creation platform to: (i) execute a forward feature transform, (ii) create a virtual sensor estimation lookup table for an attacked monitoring node from monitoring nodes that are not currently being attacked, (iii) execute an inverse feature transform, and (iv) create normal space data and attacked space data based on information from a high-fidelity, physics-based model and virtual controllers.

2. The system of claim 1, wherein the virtual sensor creation platform is further to perform data pre-processing to create local features for the plurality of monitoring nodes.

3. The system of claim 1, wherein the virtual sensor creation platform creates a virtual sensor using a linear principal component analysis.

4. The system of claim 3, wherein a matrix C is computed during a training phase using a linear least squares regression.

5. The system of claim 4, wherein the virtual sensor creation platform builds the virtual sensor estimation lookup table with matrices $C_{i,j}$ where j indicates a number of attacked monitoring nodes being estimated by the virtual sensor and i indicates a particular attacked monitoring nodes being estimated.

6. The system of claim 5, wherein the inverse feature transform maps feature vectors back to input space.

7. The system of claim 6, wherein the virtual sensor creation platform is further to perform a verification process using the virtual sensor estimation lookup table to verify how closely estimated sensor values are to original sensor values in the input space.

8. The system of claim 1, wherein signals are processed in a sliding time window during real-time detection.

9. A computerized method to protect an industrial asset, comprising:
receiving signals from a plurality of monitoring nodes associated with the industrial asset, each monitoring node generating a series of monitoring node values over time that represent operation of the industrial asset;
executing, by a virtual sensor creation platform comprising one or more processors, a forward feature transform;
creating a virtual sensor estimation lookup table for an attacked monitoring node from monitoring nodes that are not currently being attacked;
executing an inverse feature transform; and
creating normal space data and attacked space data based on information from a high-fidelity, physics-based model and virtual controllers.

10. The method of claim 9, further comprising:
performing data pre-processing to create local features for the plurality of monitoring nodes.

11. The method of claim 9, further comprising:
creating a virtual sensor using a linear principal component analysis.

12. The method of claim 11, wherein a matrix C is computed during a training phase using a linear least squares regression.

13. The method of claim 12, further comprising:
building the virtual sensor estimation lookup table with matrices $C_{i,j}$ where j indicates a number of attacked monitoring nodes being estimated by the virtual sensor and i indicates a particular attacked monitoring nodes being estimated.

14. The method of claim 13, wherein the inverse feature transform maps feature vectors back to input space.

15. The method of claim 13, further comprising:
performing a verification process using the virtual sensor estimation lookup table to verify how closely estimated sensor values are to original sensor values in the input space.

16. The method of claim 9, wherein signals are processed in a sliding time window during real-time detection.

17. A non-transitory, computer-readable medium storing instructions that, when executed by a computer processor, cause the computer processor to perform a method comprising:
receiving signals from a plurality of monitoring nodes associated with an industrial asset, each monitoring node generating a series of monitoring node values over time that represent operation of the industrial asset;
executing, by a virtual sensor creation platform comprising one or more processors, a forward feature transform;
creating a virtual sensor estimation lookup table for an attacked monitoring node from monitoring nodes that are not currently being attacked;
executing an inverse feature transform, and
creating normal space data and attacked space data based on information from a high-fidelity, physics-based model and virtual controllers.

* * * * *